United States Patent [19]

Uhl et al.

[11] Patent Number: 4,785,065

[45] Date of Patent: Nov. 15, 1988

[54] BINDERS FOR TRANSFER PRINTING

[75] Inventors: Guenter Uhl, Worms; Rudolf Toex; Gerhard Schroeder, both of Limburgerhof; Klaus Schnell, Schifferstadt, all of Fed. Rep. of Germany

[73] Assignee: BASF Aktiengesellschaft, Rheinland-Pfalz, Fed. Rep. of Germany

[21] Appl. No.: 68,177

[22] Filed: Jun. 30, 1987

[30] Foreign Application Priority Data

Jul. 5, 1986 [DE] Fed. Rep. of Germany ....... 3622602

[51] Int. Cl.$^4$ .............................................. C08F 26/08
[52] U.S. Cl. ...................................... 526/264; 524/548
[58] Field of Search .......................... 524/548; 526/264

[56] References Cited

U.S. PATENT DOCUMENTS

| | | | |
|---|---|---|---|
| 3,153,640 | 10/1964 | Barnum et al. | 526/264 |
| 3,406,155 | 10/1968 | Azorlosa et al. | 526/264 |
| 3,417,054 | 12/1968 | Merijan et al. | 526/264 |
| 3,423,367 | 1/1969 | Merijan et al. | 526/264 |
| 3,532,679 | 10/1970 | Steckler | 526/264 |
| 3,933,766 | 1/1976 | Hofmann et al. | 526/264 |
| 3,970,606 | 7/1976 | Field et al. | 526/264 |
| 3,977,828 | 8/1976 | Becker et al. | 8/529 |
| 4,042,320 | 8/1977 | Becker et al. | 8/524 |
| 4,094,634 | 6/1978 | Becker et al. | 8/558 |
| 4,182,802 | 1/1980 | Loshaek et al. | 526/264 |
| 4,182,851 | 1/1980 | Straub et al. | 526/264 |
| 4,510,197 | 4/1985 | Shah | 526/264 |
| 4,524,061 | 6/1985 | Cho et al. | 526/264 |

FOREIGN PATENT DOCUMENTS

| | | | |
|---|---|---|---|
| 0007472 | 5/1963 | Japan | 526/264 |
| 0231003 | 10/1986 | Japan | 526/264 |

*Primary Examiner*—Joseph L. Schofer
*Assistant Examiner*—J. M. Reddick
*Attorney, Agent, or Firm*—Oblon, Fisher, Spivak, McClelland & Maier

[57] ABSTRACT

Binders are used in printing inks and print pastes for transfer printing, consisting of copolymers of N-vinyl-caprolactam, the use of these copolymers as binders in printing inks and printing pastes, and printing inks and print pastes containing these.

2 Claims, No Drawings

BINDERS FOR TRANSFER PRINTING

The present invention relates to binders for transfer printing, their use for this purpose, and printing inks and printing pastes containing these binders.

In thermal transfer printing, also referred to simply as transfer printing, papers are printed with dyes which, as a result of heat and contact, sublime onto the desired substrate. After printing and drying has been carried out, the printed papers are stored temporarily and, when required, the dyes are transferred to the substrate with the aid of transfer calenders, thermal transfer presses or transfer presses, in some cases under reduced pressure.

The transfer calenders consist of a heated cylinder and continuous belt running around the drum. The printed transfer paper together with the substrate to be printed is fed, under slight pressure, between the cylinder and the belt. In the case of transfer printing presses, papers and substrate are subjected to the transfer printing process between a heated surface and the platen of the press. The temperatures of the cylinders or of the heated surfaces are advantageously 170°–250 20 C., preferably 190°–225° C. Under these conditions, the dyes sublime from the transfer paper onto the substrate.

The dyes which are suitable for the thermal transfer printing process are known from the literature. They are, in particular, sparingly soluble or insoluble disperse dyes from various classes, eg. aminoketone, ketimine, nitro, methine, nitrodiphenylamine, quinoline, aminonaphthoquinone and coumarin dyes and azo dyes, such as mono- and disazo dyes.

Vat dyes are also suitable. These include, for example, indigoid dyes or anthraquinone vat dyes, including the anthrimides, anthraquinoneacridones, anthraquinonethiazoles and anthraquinonylazines, as well as derivatives of fused ring systems, e.g. naphthalene dyes, perylene dyes, sulfurized carbazoles and quinone dyes.

If the thermal transfer printing process is carried out without the use of reduced pressure, dyes having molecular weights of from 180 to 400, preferably from 200 to 400, are generally used. If reduced pressure is employed, for example from 100 to 130 mbar, fairly high molecular weight dyes too can be transferred.

Optical brighteners, e.g. naphthalimide derivatives of stilbenedisulfonic acid or styrene/benzene derivatives, are also suitable for the transfer printing process.

Some transfer papers themselves are printed on high-speed paper printing machines by the gravure or flexographic printing method. Because of the high printing speeds, it is necessary to employ low-viscosity printing inks. Viscosities corresponding to an average efflux time of from 15 to 25 sec, measured usfng a 4 mm nozzle in a DIN cup at 23° C., are required for this purpose. To achieve rapid drying, the printing inks are generally based on organic solvents.

If the papers are printed on conventional textile printing machines by the roller printing, rotary or flat screen printing method, substantially lower printing speeds are used, these being on average 20–80 m/min. The printed papers are dried for from 30 sec to 1½ min at 80°–120° C., depending on the type of machine. Printing is carried out in this case using not solvent-containing printing inks but aqueous print pastes with viscosities which have preferably been brought to 2–8 Pa.s.

In practice, the printing inks and print pastes used contain not only the dye but also a binder to bind the dyes to the transfer printing papers, and the conventional additives and assistants.

The known binders generally used in gravure and flexographic printing processes are not compatible with water. These are, for example, rosin, aromatic hydrocarbon resins, polyvinyl acetate and polyvinyl butyral. Dissolving these products is a time-consuming operation, and dye pastes prepared in water can be used only in minor amounts, if at all. They must be anhydrous and are generally incorporated during preparation of the printing inks. The printer has no possibility of preparing printing inks himself at short notice.

Processes in which binders are used which are soluble in any ratio both in water and in the lower alcohols used as solvents, or which form emulsions, have not been disclosed to date or at least have not become established in practice.

Water-soluble binders have been tested as binders and in some cases as thickeners, preferably for print pastes used on textile printing machines, some of these binders being in current use. Examples of these binders are alginates, cellulose derivatives, polyacrylates, polyvinylpyrrolidone, polyvinyl alcohol, partially hydrolyzed polyvinyl acetate, starch products, gelatin, polyacrylamide, polyvinyl methyl ether and waterglass.

Some of these products tend to form threads during printing, others stick at room temperature, and yet others form brittle films which splinter in the dry state. Undesirable ghost images are formed. Although some of the products give good films having good adhesion, they form a barrier layer for the dye and thus have a dye-retarding effect. Binders based on polyvinyl alcohols have proven very useful. However, neither polyvinyl alcohols nor other water-soluble binders give satisfactory prints on gravure or flexographic printing machines for paper.

The binders for the thermal transfer printing process must guarantee satisfactory running behavior on the machines. They must have good adhesion to the papers and good fastness to rubbing, since abrasion of the dye or splintering of the print layer may occur during rolling and unrolling of the papers, and also as a result of shocks or impact. Consequently, ghost images are produced after transfer to the substrate, i.e. abrasion ghosting.

Furthermore, there must be no migration of the dyes in the binder or from the binder into the paper during storage. Otherwise, blurred contours will result, shifts in hue in the case of dye mixtures, i.e. migration ghosting.

Under transfer printing conditions, the binder should retain very little dye, i.e. it must have little or no retarding effect.

German Published Application DAS 2,520,527 describes aqueous printing inks and print pastes for transfer printing. The binders/thickeners used there do not give optimum results in every case. The novel binders are not revealed in this prior art.

Examples of substrates for the thermal transfer printing process are woven fabrics, knitted fabrics and nonwovens of polyester, polyacrylonitrile, nylon and appropriately prefinished cellulose materials, as well as coated surfaces made of polyester, polyacrylonitrile, nylon or other dyeable materials.

It is an object of the present invention to provide a binder for transfer printing which makes it possible to process aqueous dye dispersions for printing inks and print pastes without problems, i.e. without the above-mentioned disadvantages.

We have found that this object is achieved by a binder for use in printing inks and print pastes for transfer printing, consisting of a copolymer composed of, based on the weight of the monomers, (a)
5–95% by weight of N-vinylcaprolactam,
95–5% by weight of N-vinylpyrrolidone and
0–30% by weight of an alkyl ester or hydroxyalkyl ester of acrylic acid or methacrylic acid where alkyl is of 1 to 14 carbon atoms or hydroxyalkyl is of 2 or 3 carbon atoms, of a vinyl ester of a saturated carboxylic acid of 2 or 3 carbon atoms, acrylic acid, methacrylic acid, maleic acid or itaconic acid, the monomeric carboxylic acids being in the form of their alkali metal or ammonium salts, acrylamide or methacrylamide, or mixtures of these monomers, or (b)
20–80% by weight of N-vinylcaprolactam and
20–80% by weight of an alkyl ester of acrylic acid or methacrylic acid where alkyl is of 1 to 14 carbon atoms or acrylamide, or mixtures of these monomers, where if the monomer is an alkyl ester of acrylic acid or methacrylic acid where alkyl is of 1 to 4 carbon atoms, it is present in an amount of not more than 30% by weight, with which the disadvantages described above can be avoided, and the use of these copolymers as binders in printing inks and print pastes for transfer printing, and print pastes and printing inks containing these copolymers.

In the novel copolymer, suitable alkyl esters of acrylic acid are, for example, methyl acrylate, ethyl acrylate, butyl acrylate, ethylhexyl acrylate and lauryl acrylate, suitable alkyl esters of methacrylic acid are, for example, ethyl methacrylate and butylmethacrylate, suitable hydroxyalkyl esters of acrylic or methacrylic acid are, for example, hydroxyethyl acrylate, hydroxyethyl methacrylate, hydroxypropyl acrylate and hydroxypropyl methacrylate, and suitable vinyl esters are, for example, vinyl acetate and vinyl propionate.

The preferred binders consist of (a)
20–80% by weight of N-vinylcaprolactam,
80–20% by weight of N-vinylpyrrolidone and
0–30% by weight of an alkyl or hydroxyalkyl ester of acrylic acid, where alkyl is of 1 to 8 carbon atoms and hydroxyalkyl is of 2 or 3 carbon atoms, vinyl acetate, vinyl propionate, acrylamide or mixtures of these monomers, or (b)
30–60% by weight of N-vinylcaprolactam and
70–40% by weight of acrylamide.

For practical use, very particularly preferred copolymers are those consisting of
20–80% by weight of N-vinylcaprolactam and
80–20% by weight of N-vinylpyrrolidone.

For the monomers which may additionally be present under (a), amounts of 5–25% by weight are preferred.

The novel binders are completely soluble in water and lower aliphatic alcohols or, particularly at room temperature, form stable emulsions in these solvents, especially if hydrophobic monomers are incorporated.

The copolymers are prepared in a conventional manner, for example by solution polymerization in the presence of a free radical initiator and in the presence or absence of a regulator. Solvents advantageously used for the polymerization are those which permit the resulting polymer solutions to be used according to the invention either directly or, if necessary, after dilution.

The copolymers have K values of from 15 to 50, the K value being determined in a 1% strength by weight solution in tetrahydrofuran or water at 25° C. by the Fikentscher method. The preferred K values are from 25 to 35 where the copolymers are used as binders in printing inks, and from 30 to 40 where they are used in print pastes. The 30% strength by weight solution of a novel binder in a water/ethanol mixture in a ratio of 70–95 parts by weight of water to 5–30 parts by weight of ethanol, diluted with water in a ratio of 1:4, based on the weight, should have a viscosity corresponding to an efflux time of 15–30 sec from a DIN cup of 4 mm diameter at 23° C.

Printing inks contain from 0.1 to 30, preferably from 0.5 to 20, % by weight of the novel binder, and print pastes from 1.5 to 30, preferably from 7 to 20, % by weight. The novel binders are advantageously used in the form of their aqueous, aqueous-alcoholic or purely alcoholic solutions or emulsions.

An advantageous composition for a printing ink contains from 0.1 to 30, preferably from 0.5 to 20, % by weight of the novel binder,
from 0.1 to 30, preferably from 1 to 15, % by weight of a disperse dye in the form of a conventional, aqueous formulation of 30–50% strength by weight, based on the dye,
from 0.1 to 10% by weight of added assistants,
from 20 to 96, preferably from 90 to 60, % by weight of a lower alcohol as a solvent and
from 0 to 30, preferably from 1 to 10, % by weight of water.

An expedient and advantageous composition for a print paste contains from 1.5 to 30, preferably from 7 to 20, % by weight of the novel binder,
from 0.5 to 5.0, preferably from 1.5 to 2.5, % by weight of a thickener and
from 0.1 to 30% by weight of a disperse dye in the form of a conventional, aqueous 30–50% strength by weight formulation,
with or without from 0.05 to 1.0% by weight of added assistants and
water to make up to 100% by weight.

In this context, the following may be stated by way of explanation:

The conventional, commercial aqueous formulations of disperse dyes may be used, as are familiar to any skilled worker; such disperse dyes in the form of aqueous dispersions for printing inks or print pastes are described in, for example, German Published Application DAS 2,520,527.

The novel binders are preferably used in the form from 25 to 50% strength by weight aqueous, alcoholic or aqueous-alcoholic solutions. Particularly suitable lower alcohols are ethanol, n-propanol and isopropanol.

Assistants added to printing inks are, in particular, agents for retarding drying, in particular polyhydric alcohols, such as glycols, glycerol, ethylene glycol, propylene glycol or glycol ethers, which can be used in amounts of not more than 10% by weight.

Examples of other assistants are leveling agents and flow improvers, for example oxyalkylated diamines in amounts of not more than 10%, or additives such as silicone-free commercial antifoams, dispersants and emulsifiers, for example the Na salt of ligninsulfonic acid and non-ionic emulsifiers from various sources, in amounts of not more than 3%.

Ethanol, n-propanol and isopropanol have proven particularly useful as alcoholic solvents in the printing inks.

The print pastes usually contain a thickener. In principle, the thickeners known from the literature and used in textile printing can be employed, provided that they do not have a dye-agglomerating effect. The known synthetic thickeners based on high molecular weight, generally partially crosslinked polyacids, e.g. polyacrylic acid, copolymers of acrylic acid and/or maleic acid, or acrylic acid/acrylamide copolymers, having molecular weights of from 500,000 to 3 million, are very suitable. As a rule, they are used in the form of their alkali metal salts and preferably in the form of the ammonium salts.

Examples of aditional assistants for print pastes are, in particular, silicone-free antifoams and ethylene glycol as an agent for retarding drying.

The abovementioned compositions have the viscosities necessary for advantageous use, or these viscosities can readily be obtained by means of solvents in the case of printing inks or by varying the amount of thickeners or the amount of water in the case of print pastes.

The novel binders have good adhesion to the printed papers, are sufficiently flexible to avoid splintering and possess good abrasion resistance. The shelf life of the papers is very good, and dye transfer from the paper to the substrate is excellent. The binders do not have a significant retarding effect. Because of the stated properties, the same applies to abrasion ghosting and migration ghosting. Thus, the binders simultaneously act as a barrier layer for the dye molecules during storage of the printed papers. During transfer printing at elevated temperatures, the dye molecules can diffuse virtually completely from this binder acting as a barrier layer. Under the usual thermal transfer printing conditions, this gives satisfactory transfer prints with excellent dye transfer. The binders according to the invention have advantageous thermoplastic behavior which, at the temperatures used for transfer printing, produces a slightly tacky surface, so that friction between the transfer paper and the substrate to be printed is prevented.

In the Examples, parts and percentages are by weight. The K values are determined in 1% strength by weight tetrahydrofuran solution or in water at 25° C.

EXAMPLE 1

| | |
|---|---|
| 300 parts by weight | of a 30% strength solution of a copolymer of 70% of vinylcaprolactam and 30% of vinylpyrrolidone in 80:20 water/ethanol, having a K value of 33 determined in 1% strength by weight tetrahydrofuran solution at 25° C., |
| 100 parts by weight | of ethylene glycol and |
| 600 parts by weight | of ethyl alcohol were mixed. |
| 1000 parts by weight | |
| 200 parts by weight | of a 50% strength, aqueous paste of Disperse Red 60 (C.I. 60756) and |
| 300 parts by weight | of ethyl alcohol were added to |
| 500 parts by weight | of this mixture, while stirring gently. |
| 1000 parts by weight | |

This printing ink was used to print a transfer paper on a gravure printing press. The paper had a very good shelf life and, when used for thermal transfer printing for 25 sec at 210° C., gave an excellent deep red transfer print having sharp contours on a knitted polyester fabric.

EXAMPLE 2

| | |
|---|---|
| 300 parts by weight | of a 35% strength solution of a copolymer of 60% of vinylcaprolactam, 30% of vinylpyrrolidone and 10% of hydroxypropyl acrylate in 85:15 water/isopropanol, having a K value of 36 determined in 1% strength by weight aqueous solution at 25° C., |
| 40 parts by weight | of propylene glycol monomethyl ether and |
| 660 parts by weight | of isopropanol were mixed. |
| 1000 parts by weight | |
| 220 parts by weight | of 40% strength, aqueous paste of Disperse Blue 72 (C.I. 60725) and |
| 280 parts by weight | of ethyl alcohol were added to |
| 500 parts by weight | of this mixture, while stirring gently. |
| 1000 parts by weight | |

This printing ink was used to print a transfer paper on a flexographic printing press. The paper had a very long shelf life. When used for transfer printing for 30 sec at 210° C., it gave a deep blue print having sharp contours on a woven polyester fabric.

EXAMPLE 3

Printing ink as described in Example 2, in which the binder used comprised
300 parts by weight of a 30% strength solution of a copolymer consisting of 60% of vinylcaprolactam and 40% of acrylamide, having a K value of 38 determined in 1% strength by weight aqueous solution at 25° C., in 85:15 water/ethanol.

EXAMPLE 4

Printing ink as described in Example 2, in which the binder used comprised
300 parts by weight of a 30% strength solution of a copolymer consisting of 60% of vinylcaprolactam, 25% of vinylpyrrolidone and 15% of ethylhexyl acrylate, having a K value of 39 determined in 1% strength by weight tetrahydrofuran solution at 25° C., in 85:15 water/ethanol.

EXAMPLE 5

Printing ink as described in Example 2, in which the binder used comprised
300 parts by weight of a 30% strength solution of a copolymer of 52% of vinylcaprolactam, 23% of vinylpyrrolidone and 25% of vinyl acetate in 85:15 water/ethanol, having a K value of 37 determined in 1% strength by weight tetrahydrofuran solution at 25° C.

Examples of print pastes

EXAMPLE 6

The following were stirred in succession into

| | |
|---|---|
| 921.5 parts by weight | of water: |
| 7.5 parts by weight | of an ethylene/maleic acid copolymer (molecular weight greater than 500,000), |
| 10.0 parts by weight | of a 25% strength aqueous ammonia solution, |
| 1 part by weight | of a 5% strength solution of monostearyl phosphate in trisisononyl citrate as an antifoam mixture and |
| 60 parts by weight | of a 30% strength solution of a |

| | |
|---|---|
| | copolymer of 60% vinylcaprolactam, 25% of vinylpyrrolidone and 15% of vinyl propionate in 80:20 water/isopropanol, having a K value of 36 determined in 1% strength by weight tetrahydrofuran solution at 25° C. |
| 1000 parts by weight | |
| 150 parts by weight | of a 30% strength aqueous formulation of Disperse Yellow 181 were added to |
| 850 parts by weight | of this binder-containing paste |
| 1000 parts by weight | |

The print paste obtained was used to print a transfer paper on a rotary screen printing press. The paper possessed good abrasion resistance and had a very long shelf life. The transfer printing process at 205° C. for 45 sec gave a satisfactory, deep, yellow print, having sharp contours, on tin-plate coated with polyvinyl chloride.

EXAMPLE 7

| | |
|---|---|
| 35 parts by weight | of a 30% strength aqueous paste of a partially crosslinked high molecular weight copolymer of 90% of acrylic acid and 10% of acrylamide, neutralized with ammonia, |
| 60 parts by weight | of a 32% strength solution of a copolymer of 60% of vinylcaprolactam, 25% of vinylpyrrolidone and 15% of butyl acrylate, having a K value of 45 determined in 1% strength by weight tetrahydrofuran solution at 25° C., in 85:15 water/ethanol and |
| 2 parts by weight | of ethylhexanoic acid reacted with 3 units of propylene oxide, as an antifoam, were stirred in succession into |
| 903 parts by weight | of water. |
| 1000 parts by weight | |

A binder-containing paste was obtained.

| | |
|---|---|
| 150 parts by weight | of a 30% strength aqueous dye paste of Disperse Red 11 (C.I. 62015) were mixed with |
| 850 parts by weight | of this binder-containing paste |
| 1000 parts by weight | |

The resulting print paste was used to print a transfer paper on a flat screen printing press. The paper had a very long shelf life and, in the transfer printing process for 30 sec at 200° C., gave a deep print having sharp contours on a nylon fabric.

EXAMPLE 8

| | |
|---|---|
| 80 parts by weight | of 5% strength aqueous paste of a partially crosslinked, high molecular weight polyacrylic acid having a molecular weight of from 2.5 to 3 million, neutralized with ammonia, |
| 90 parts by weight | of a 30% strength solution of a copolymer of 70% of vinylcaprolactam, 15% of vinylpyrrolidone, 12% of ethyl acrylate and 3% of hydroxyethyl acrylate, having a K value of 40-45 determined in 1% strength by weight tetrahydrofuran solution at 25° C., in 80:20 water/isopropanol and |
| 2 parts by weight | of an ethylhexanol reacted with 3 units of propylene oxide were stirred in succession into |
| 828 parts by weight | of water. |

| | |
|---|---|
| 1000 parts by weight | |
| 160 parts by weight | of a 30% strength aqueous paste of Disperse Blue 347 were added to |
| 840 parts by weight | of this binder-containing paste, |
| | while stirring. |
| 1000 parts bt weight | |

After transfer printing on a triacetate fabric for 30 sec at 210° C., a deep, greenish blue print having sharp contours was obtained.

Preparation examples

EXAMPLE 1

A mixture of
3 parts of azobisisobutyronitrile,
138.5 parts of ethanol,
210 parts of N-vinylcaprolactam,
90 parts of N-vinylpyrrolidone,
196.4 parts of fully deionized water and
4.5 parts of but-1-en-3-ol (as a regulant) was initially taken in a 2 l reaction flask equipped with a stirrer, a thermometer and a reflux condenser, and the stirred mixture was refluxed for 4 hours.

Thereafter, the mixture was cooled and at the same time 357.6 parts of fully deionized water were added in the course of 1 hour to dilute the resulting polymer solution. Stirring was continued for a further 3 hours in order to obtain a homogeneous solution.

A 30% strength solution of a copolymer and 70% of N-vinylcaprolactam and 30% of N-vinylpyrrolidone in 80:20 water/ethanol, having a K value of 33 determined in 1% strength by weight tetrahydrofuran solution at 25° C., was obtained. This solution can be used directly.

EXAMPLE 2

A mixture of
3.5 parts of azobisisobutyronitrile,
96.2 parts of isopropanol,
210 parts of N-vinylcaprolactam
105 parts of N-vinylpyrrolidone
35 parts of 2-hydroxypropyl acrylate,
294.6 parts of fully deionized water and
5.3 parts of but-1-en-3-ol was polymerized, 250.4 parts of fully deionized water were added to the resulting polymer solution on cooling, and the mixture was stirred for a further 3 hours, these tests being carried out as described in Example 1.

A 35% strength solution of a copolymer of 60% of N-vinylcaprolactam, 30% of N-vinylpyrrolidone and 10% of 2-hydroxypropyl acrylate in 85:15 water/isopropanol, having a K value of 36 determined in 1% strength by weight aqueous solution at 25° C., was obtained.

EXAMPLE 3

A mixture of
3 parts of azobisisobutyronitrile,
103.9 parts of ethanol,
180 parts of N-vinylcaprolactam,
240 parts of a 50% strength solution of acrylamide in water,
111 parts of fully deionized water and
4.5 parts of but-1-en-3-ol was prepared.

In a 2 l reaction flask equipped with a stirrer, a thermometer and a reflux condenser, 130 parts of this mixture were refluxed, while stirring, and the remainder of the mixture was added in the course of 1 hour. To complete the polymerization, the mixture was refluxed for a further 3 hours.

It was then cooled, and 357.6 parts of fully deionized water were added at the same time in the course of 1 hour. The mixture was then stirred for a further 3 hours.

A 30% strength solution of a copolymer of 60% of vinylcaprolactam and 40% of acrylamide in 85:15 water/ethanol, having a K value of 38 determined in 1% strength by weight aqueous solution at 25° C., was obtained.

EXAMPLE 4

A mixture of
3 parts of azobisisobutyronitrile,
103.9 parts of ethanol,
180 parts of N-vinylcaprolactam,
75 parts of N-vinylpyrrolidone,
45 parts of 2-ethylhexyl acrylate,
231 parts of fully deionized water and
4.5 parts of but-1-en-3-ol was polymerized, 357.6 parts of fully deionized water were added to the resulting polymer solution on cooling, and the mixture was stirred for a further 3 hours, these steps being carried out as described in Example 1.

A 30% strength solution of a copolymer of 60% of N-vinylcaprolactam, 25% of N-vinylpyrrolidone and 15% of 2-ethylhexyl acrylate in 85:15 water/ethanol, having a K value of 39 determined in 1% strength by weight tetrahydrofuran solution at 25° C., was obtained.

EXAMPLE 5

A mixture of
3 parts of azobisisobutyronitrile,
103.9 parts of ethanol,
156 parts of N-vinylcaprolactam,
69 parts of N-vinylpyrrolidone,
75 parts of vinyl acetate,
231 parts of fully deionized water and
4.5 parts of but-1-en-3-ol was initially taken and polymerized, 357.6 parts of fully deionized water were added to the resulting polymer solution on cooling, and the mixture was stirred for a further 3 hours, these tests being carried out as described in Example 1.

A 30% strength solution of a copolymer of 52% of N-vinylcaprolactam, 23% of N-vinylpyrrolidone and 25% of vinyl acetate in 85:15 water/ethanol, having a K value of 37 determined in 1% strength by weight tetrahydrofuran solution at 25° C., was obtained.

EXAMPLE 6

A mixture of
3 parts of azobisisobutyronitrile,
139.4 parts of isopropanol,
180 parts of N-vinylcaprolactam,
75 parts of N-vinylpyrrolidone,
45 parts of vinyl propionate and
200 parts of fully deionized water was polymerized, 357.6 parts of fully deionized water were added to the resulting polymer solution on cooling, and the mixture was stirred for a further 3 hours, these steps being carried out as described in Example 1.

A 30% strength solution of a copolymer of 60% of N-vinylcaprolactam, 25% of N-vinylpyrrolidone and 15% of vinyl propionate in 80:20 water/isopropanol, having a K value of 36 determined in 1% strength by weight tetrahydrofuran solution at 25° C., was obtaied.

EXAMPLE 7

A mixture of
3.2 parts of azobisisobutyronitrile,
101.2 parts of ethanol,
192 parts of N-vinylcaprolactam,
80 parts of N-vinylpyrrolidone,
48 parts of n-butyl acrylate,
258.4 parts of fully deionized water and
2.4 parts of but-1-en-3-ol was polymerized, 314.8 parts of fully deionized water were added to the resulting polymer solution on cooling, and the mixture was stirred for a further 3 hours, these steps being carried out as described in Example 1.

A 32% strength solution of a copolymer of 60% of N-vinylcaprolactam, 25% of N-vinylpyrrolidone and 15% of n-butyl acrylate in 85:15 water/ethanol, having a K value of 45 determined in 1% strength by weight tetrahydrofuran solution at 25° C., was obtained.

EXAMPLE 8

A mixture of
3 parts of azobisisobutyronitrile,
139.4 parts of isopropanol,
210 parts of N-vinylcaprolactam,
45 parss of N-vinylpyrrolidone,
36 parts of ethyl acrylate,
9 parts of 2-hydroxyethyl acrylate and
200 parts of fully deionized water was polymerized, 357.6 parts of fully deionized water were added to the resulting polymer solution on cooling, and the mixture was stirred for a further 3 hours, these steps being carried out as described in Example 1.

A 30% strength solution of a copolymer of 70% N-vinylcaprolactam, 15% of N-vinylpyrrolidone, 12% of ethyl acrylate and 3% of 2-hydroxyethyl acrylate in 80:20 water/isopropanol, having a K value of 40-45 determined in 1% strength by weight tetrahydrofuran solution at 25° C., was obtained.

We claim:

1. A binder for transfer printing, consisting of a copolymer consisting of, based on the weight of the monomers,
   (a) 5-95% by weight of N-vinylcaprolactam,
   95-5% by weight of N-vinylpyrrolidone and
   0-30% by weight of an alkyl ester or hydroxyalkyl ester of acrylic acid or methacrylic acid where alkyl is of 1 to 14 carbon atoms or hydroxyalkyl is of 2 or 3 carbon atoms, of a vinyl ester of a saturated carboxylic acid of 2 or 3 carbon atoms, acrylic acid, methacrylic acid, maleic acid or itaconic acid, the monomeric carboxylic acids being in the form of their alkali metal or ammonium salts, acrylamide or methacrylamide, or mixtures of these monomers, or
   (b) 20-60% by weight of N-vinylcaprolactam and 80-40% by weight of an alkyl ester of acrylic acid or methacrylic acid where alkyl is of 1 to 14 carbon atoms, where alkyl is of 1 to 4 carbon atoms it is present in an amount of not more than 30% by weight.

2. A binder as claimed in claim 1, consisting of a copolymer consisting of
   20-80% by weight of N-vinylcaprolactam,
   80-20% by weight of N-vinylpyrrolidone and
   0-30% by weight of an alkyl or hydroxyalkyl ester of acrylic acid where alkyl is of 1 to 8 carbon atoms and hydroxyalkyl is of 2 or 3 carbon atoms, vinyl acetate, vinyl propionate, acrylamide or mixtures of these monomers.

* * * * *